United States Patent [19]

Trahms

[11] Patent Number: 5,439,150
[45] Date of Patent: Aug. 8, 1995

[54] REAR WINDOW ACCESSIBLE PICK UP TRUCK STORAGE BOX

[76] Inventor: Kurt R. Trahms, 2624 April Dawn Way, Gambrills, Md. 21054

[21] Appl. No.: 138,991

[22] Filed: Oct. 21, 1993

[51] Int. Cl.⁶ ............................................. B60R 9/00
[52] U.S. Cl. .................................. 224/404; 224/281; 224/282; 224/541; 224/543; 312/298; 312/902
[58] Field of Search ................... 224/42.42, 273, 281, 224/282; 296/37.6, 37.8; 220/521, 522; 312/902, DIG. 33, 298, 383

[56] References Cited

U.S. PATENT DOCUMENTS

| | | | |
|---|---|---|---|
| 4,580,827 | 4/1986 | Feagan | 224/42.42 |
| 4,770,330 | 9/1988 | Bonstead et al. | 224/42.42 |
| 4,848,626 | 7/1989 | Waters | 224/273 |
| 4,892,346 | 1/1990 | Berlin | 224/42.42 |
| 5,263,757 | 11/1993 | Reed | 296/37.6 |
| 5,299,722 | 4/1994 | Cheney | 224/42.42 |

*Primary Examiner*—Linda J. Sholl

[57] ABSTRACT

A pick up truck storage box having a center compartment accessible through the rear window of an associated pickup truck. The storage box is provided with a main body positionable within the truck bed behind the rear window to rest upon the upper surfaces of the truck bed. The center compartment is pivotally mounted to the main body and may be opened to facilitate access into the main body by a person within the truck through the rear window. In addition, the center compartment houses a briefcase which may be accessed through a separate lid. The briefcase is slidably disposed within the center compartment and may be extended into the truck through the rear window to allow access to articles within the briefcase or, alternatively, the briefcase may be completely removed from the upper compartment. An alternate embodiment of the present invention includes a sliding door assembly operable to enclose a volume of space between the main body of the box and the truck bed to provide additional storage capabilities.

8 Claims, 4 Drawing Sheets

REAR WINDOW ACCESSIBLE PICK UP TRUCK STORAGE BOX

BACKGROUND OF THE INVENTION

1. Field of the Invention

The present invention relates to vehicle storage compartments and more particularly pertains to a rear window accessible pickup truck storage box having a center compartment accessible through the rear window of an associated pickup truck.

2. Description of the Prior Art

The use of vehicle storage compartments is known in the prior art. More specifically, vehicle storage compartments heretofore devised and utilized for the purpose of storing articles within the bed of a pickup truck are known to consist basically of familiar, expected and obvious structural configurations, notwithstanding the myriad of designs encompassed by the crowded prior art which have been developed for the fulfillment of countless objectives and requirements.

For example, a pickup truck storage box is illustrated in U.S. Pat. No. 5,169,200 which may be utilized in the cargo bed of a pickup truck. The box is constructed of a plurality of panels and brackets which may be installed in the bed of a pickup truck to cooperatively define an enclosure.

A toolbox for a pickup truck is described in U.S. Pat. No 3,640,423 which may be mounted across the bed of a pickup truck. The box includes an elongated rectangular body and a cover with latch means at each end of the cover for releasably securing the cover to the body. Either of the two latch means can be released, thereby permitting the respective end to be raised while the other latch means functions as a pivot for the cover. A yieldable support is included near the longitudinal center of the body to support the cover in an elevated position when the box is open.

Another patent of interest is U.S. Pat. No. 4,770,330 which discloses a multi-piece straddle bed tool box for use with pickup trucks. The tool box is designed to be size adjustable and may be disassembled for easy storage and shipment. The box is provided with a removable center compartment and a pair of substantially identical end storage compartments adapted to be positioned within the bed of a pickup. The center section may be used for wide bed tool boxes, and may be removed for narrow bed tool boxes or storage.

Other relevant documents include U.S. Pat. Nos. 4,580,827, 4,749,226, and 4,967,944.

While these devices fulfill their respective, particular objectives and requirements, the aforementioned patents do not describe a pickup truck storage box having a center compartment accessible through the rear window of an associated pickup truck in which the center compartment both allows access into the storage box and houses a briefcase that may be extended into the truck through the rear window to allow access to articles within the briefcase. Furthermore, none of the known prior art vehicle storage compartments teach or suggest a sliding door assembly operable to enclose a volume between the storage box and the truck bed to provide additional storage capabilities.

In these respects, the rear window accessible pickup truck storage box according to the present invention substantially departs from the conventional concepts and designs of the prior art, and in so doing provides an apparatus primarily developed for the purpose of storing articles within the bed of a pickup truck and allowing access to such articles through the rear window of an associated pickup truck.

SUMMARY OF THE INVENTION

In view of the foregoing disadvantages inherent in the known types of vehicle storage compartments now present in the prior art, the present invention provides a new rear window accessible pickup truck storage box construction primarily developed for the purpose of storing articles within the bed of a pickup truck and allowing access to such articles through the rear window of an associated pickup truck. As such, the general purpose of the present invention, which will be described subsequently in greater detail, is to provide a new rear window accessible pickup truck storage box apparatus which has many of the advantages of the vehicle storage compartments mentioned heretofore and many novel features that result in a pickup truck storage box which is not anticipated, rendered obvious, suggested, or even implied by any of the prior art vehicle storage compartments, either alone or in any combination thereof.

To attain this, the present invention essentially comprises a rear window accessible pickup truck storage box having a center compartment accessible through the rear window of an associated pickup truck. The storage box is provided with a main body positionable within the truck bed behind the rear window to rest upon the upper surfaces of the truck bed. The center compartment is pivotally mounted to the main body and may be opened to facilitate access into the main body by a person within the truck through the rear window. In addition, the center compartment houses a briefcase which may be accessed through a separate lid. The briefcase is slidably disposed within the center compartment and may be extended into the truck through the rear window to allow access to articles within the briefcase or, alternatively, the briefcase may be completely removed from the upper compartment. An alternate embodiment of the present invention includes a sliding door assembly operable to enclose a volume of space between the main body of the box and the truck bed to provide additional storage capabilities.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract, is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rear window accessible pickup truck storage box apparatus which has many of the advantages of the vehicle storage compartments mentioned heretofore and many novel features that result in a rear window accessible pickup truck storage box which is not anticipated, rendered obvious, suggested, or even implied by any of the prior art vehicle storage compartments, either alone or in any combination thereof.

It is another object of the present invention to provide a new rear window accessible pickup truck storage box which may be easily and efficiently manufactured and marketed.

It is a further object of the present invention to provide a new rear window accessible pickup truck storage box which is of a durable and reliable construction.

An even further object of the present invention is to provide a new rear window accessible pickup truck storage box which is susceptible of a low cost of manufacture with regard to both materials and labor, and which accordingly is then susceptible of low prices of sale to the consuming public, thereby making such pick up truck storage boxes economically available to the buying public.

Still yet another object of the present invention is to provide a new rear window accessible pickup truck storage box which provides in the apparatuses and methods of the prior art some of the advantages thereof, while simultaneously overcoming some of the disadvantages normally associated therewith.

Still another object of the present invention is to provide a new rear window accessible pickup truck storage box having a center compartment accessible through the rear window of an associated pickup truck.

Yet another object of the present invention is to provide a new rear window accessible pickup truck storage box having a center compartment which releasably contains a briefcase that may be extended into the truck through the rear window to allow access to articles within the briefcase.

Even still another object of the present invention is to provide a new rear window accessible pickup truck storage box which includes a sliding door assembly operable to enclose a volume of space between the box and the truck bed to provide additional storage capabilities.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
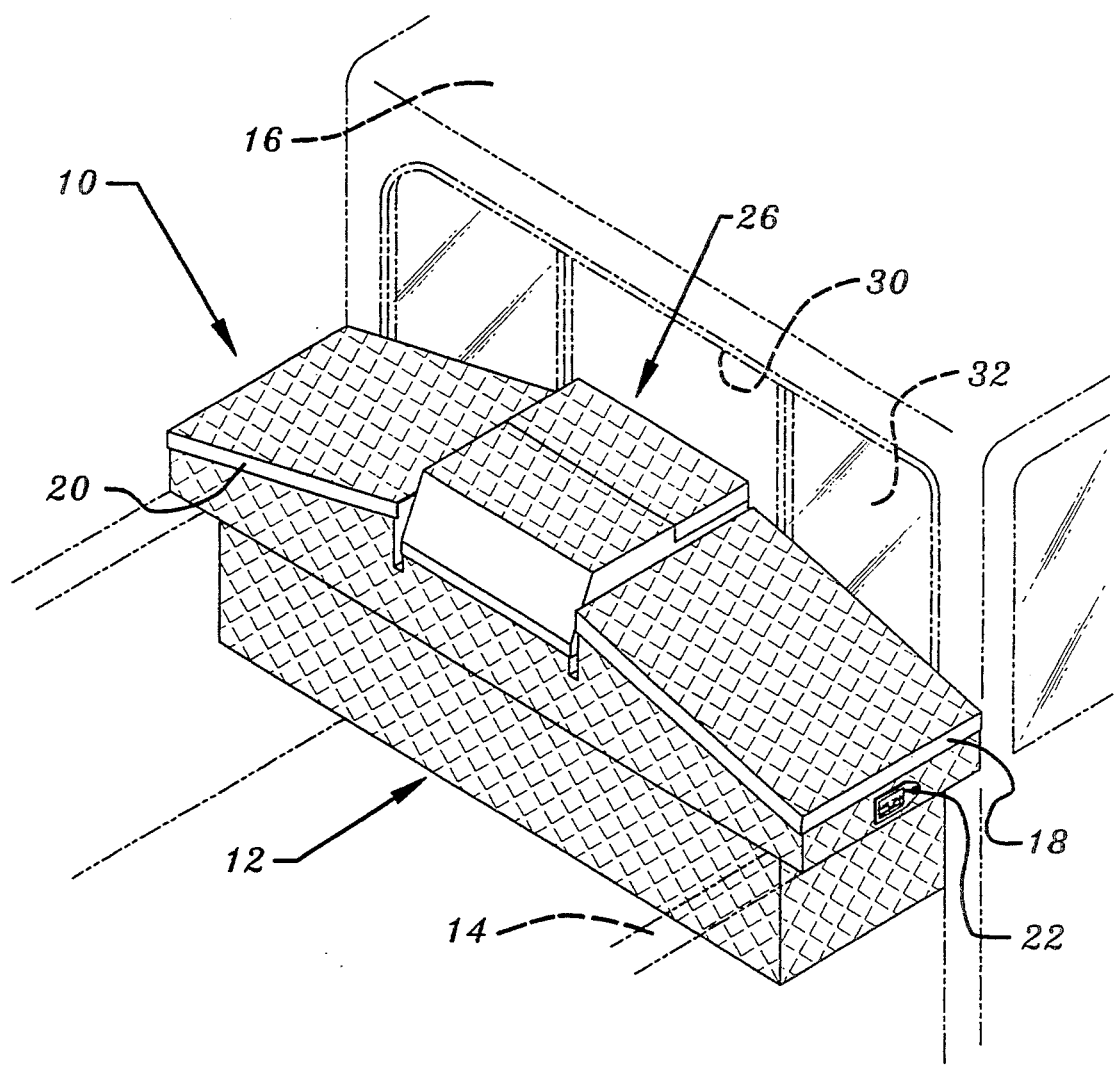
FIG. 1 is a perspective view of a first embodiment of a rear window accessible pickup truck storage box comprising the present invention.
Figure 2:
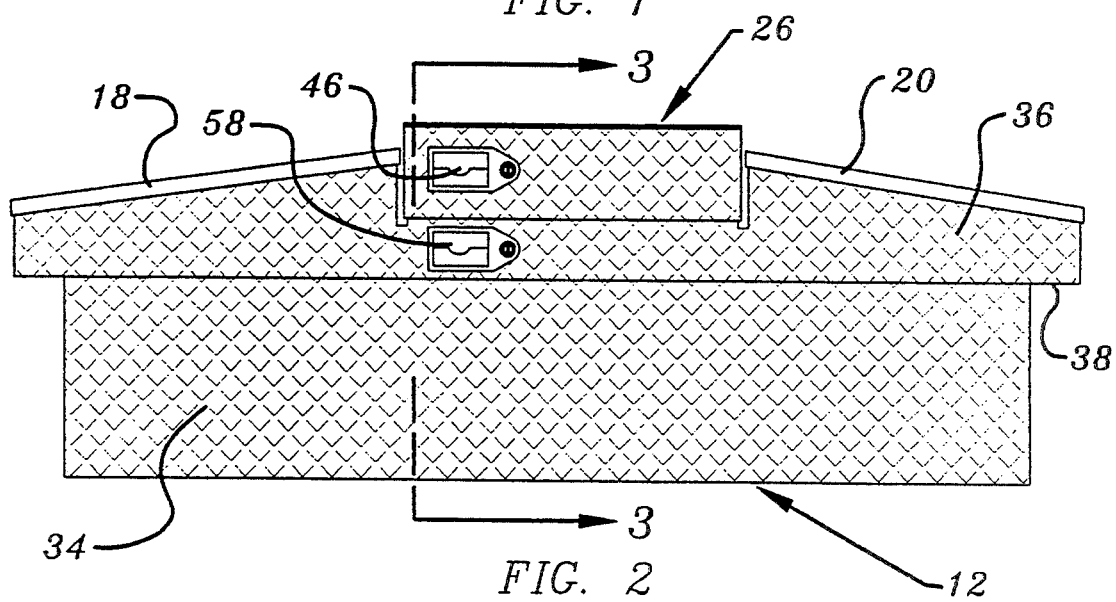
FIG. 2 is a front elevation view of the present invention.

With reference now to the drawings, and in particular to FIGS. 1–5 thereof, a first embodiment of a new rear window accessible pickup truck storage box embodying the principles and concepts of the present invention and generally designated by the reference numeral 10 will be described.

The rear window accessible pickup truck storage box 10 comprises a main body 12 dimensioned to fit within and extend between the walls of a truck bed 14 of an associated truck 16. The main body 12 is provided with a pair of access lids 18, 20 pivotally secured thereto which may be opened to facilitate access to articles positioned within the main body 12 of the storage box 10. The access lids 18, 20 may be secured to the main body by a pair of lockable access lid latches 22, 24 which effectively prevent a theft of the articles contained within the storage box 10.

A center compartment assembly 26 is positioned between the access lids 18, 20, as best illustrated in FIG. 1. The center compartment assembly 26 is pivotally coupled to the main body 12 by a hinge 28. The center compartment assembly 26 is positioned upon the main body 12 such that access to the center compartment assembly may be accomplished from within the truck 16 through an opening 30 typically provided in the rear window 32 of such a truck. This allows a user to access articles stored within the main body 12 of the truck box 10 as well as articles which may be contained within the center compartment assembly 26.

More specifically, it will be noted that the rear window accessible pickup truck storage box 10 comprises a main body 12 having a substantially rectangularly shaped lower compartment 34 integrally connected to an upper compartment 36. The upper compartment 36 is dimensioned to define a width and a length greater than a respective width and length of the lower compartment 34 so as to define an upper compartment flange 38 extending therearound. When the storage box 10 is positioned within the truck bed 14 of the truck 16 as illustrated in FIG. 1, the upper compartment flange 38 will reside upon upper surfaces of the truck bed, thereby supporting the main body 12 in a spaced relationship to an unlabeled floor of the truck bed. Suitable unillustrated fasteners may be utilized to firmly fasten the storage box 10 to portions of the truck bed 14 in a well understood manner.

The upper compartment 36 is shaped so as to define a pair of unlabeled openings having a generally sloped orientation with respect to the upper compartment flange 38. The openings facilitate access to articles contained within the main body 12 and such openings may be securely sealed from unauthorized access thereto by a pair of access lids 18, 20 which are pivotally coupled to the upper compartment 36. A pair of lockable access lid latches 22, 24 each secure the respective lids 18, 20 at their outermost ends. It should be understood that it is within the intent and purview of the present invention to hingedly mount the access lids 18, 20 along any edge thereof such that opening of the lids may be accomplished from any position around the storage box 10. The access lid latches 22, 24 are of a conventional design and, therefore, will not be described in detail.

Figure 3:
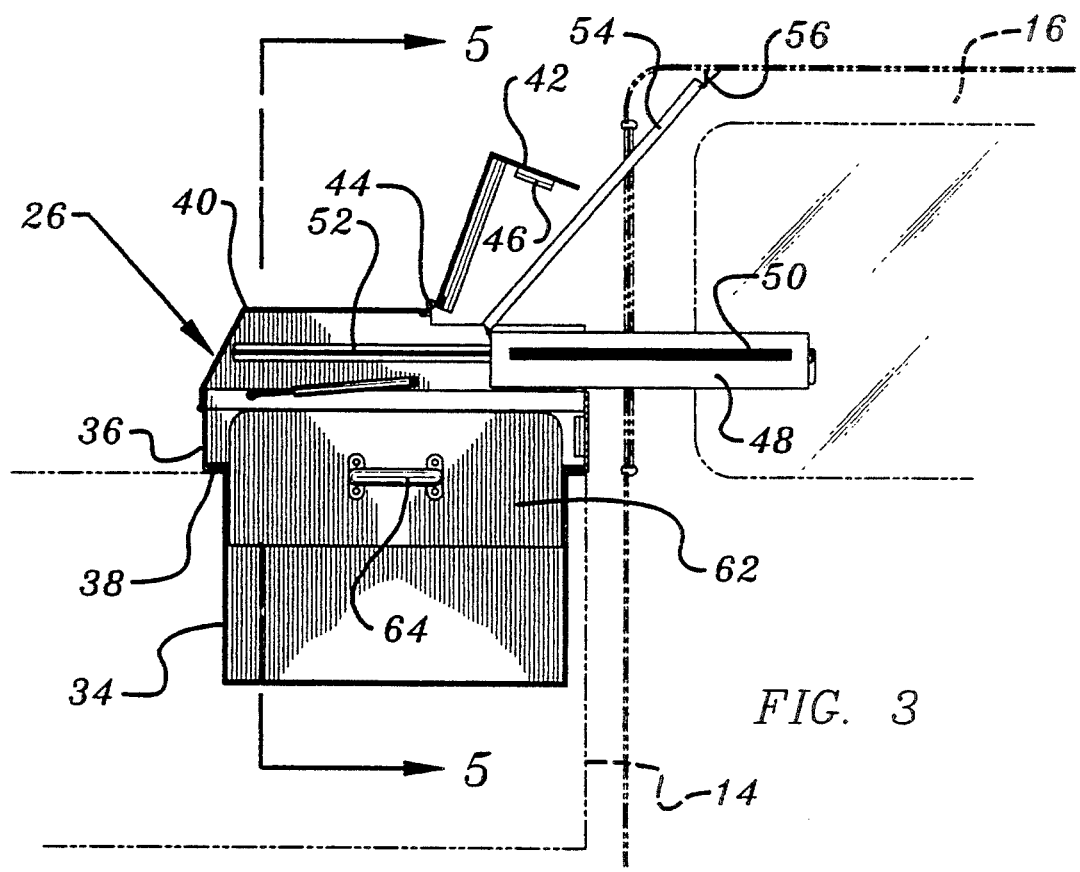
FIG. 3 is a cross-sectional view taken along line 3—3 of FIG. 2 illustrating the center compartment assembly positioned in a first operational mode.
Figure 4:
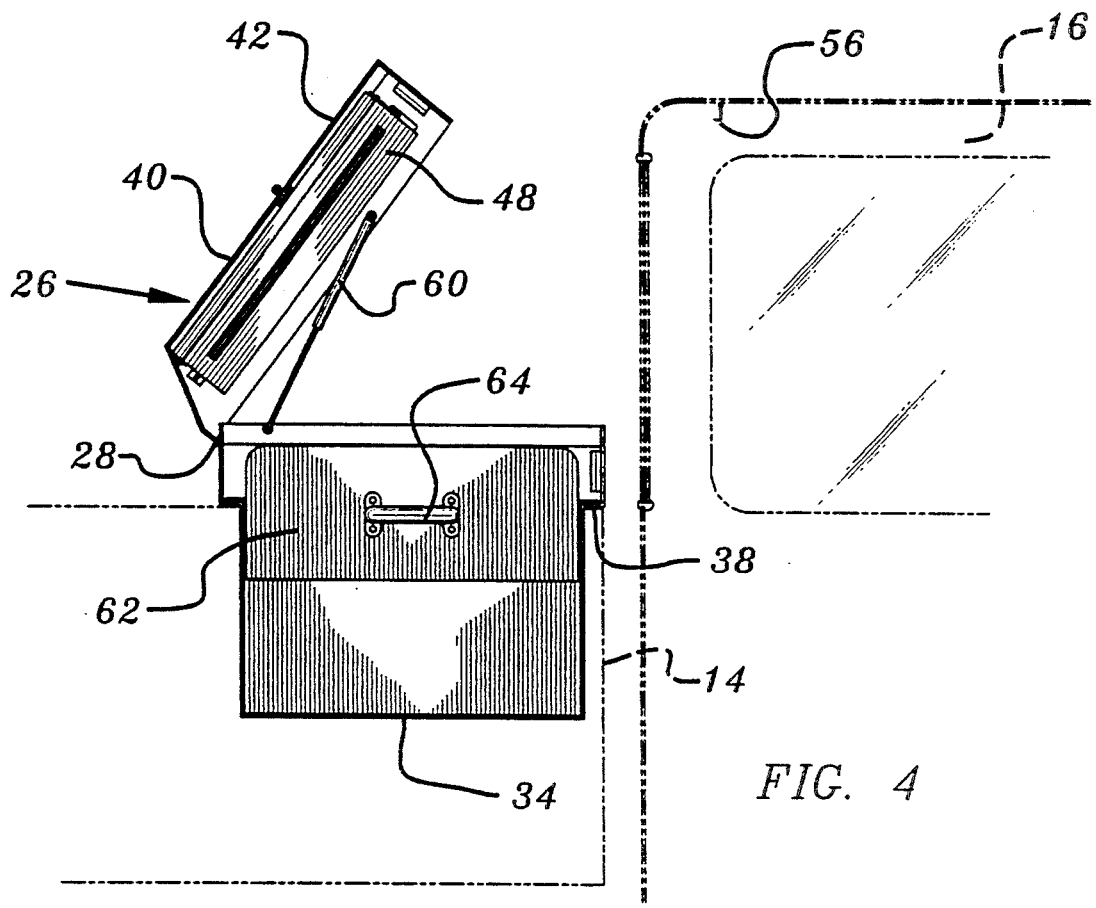
FIG. 4 is a further cross-sectional view illustrating the center compartment assembly in a second operational mode.

FIGS. 3 and 4 illustrate the operational modes of the center compartment assembly 26 and it can be seen from these figures that the center compartment assembly comprises an upper enclosure 40 which is pivotally connected over a further unillustrated opening in the upper compartment 36 by a hinge 28. The hinge 28 is positioned towards a rear of the pickup truck 16 which allows the entire upper enclosure to open towards the rear window 32 of the pickup truck 16, thereby facilitating access to the same through the opening 30 in the rear window 32 from within the truck 16. The upper enclosure 40 includes an upper enclosure lid 42 having a substantially L-shaped profile pivotally connected to the upper enclosure by a further hinge 44 which may be open to allow access into the interior of the upper enclosure. The upper enclosure lid 42 includes an upper lockable latch 46 operable to secure the upper enclosure lid to the upper enclosure 40.

Slidably disposed within the upper enclosure 40 is a briefcase 48 having a pair of elongated projections 50 positioned on respectively opposed sides thereof. The elongated projections 50 are operable to slidably engage a pair of channels 52 positioned on respectively opposed interior sides of the upper enclosure 40. This structure allows the briefcase 48 to be slidably supported within the upper enclosure 40, whereby the upper enclosure lid 42 may be opened and the briefcase extended into the truck 16, as best illustrated in FIG. 3. Once the briefcase 48 is extended into the truck 16, the elongated projections 50 will still be at least partially engaged to the channels 52, thereby supporting the briefcase 48 in the horizontal position illustrated in FIG. 3. The briefcase lid 54 may then be opened and secured in such open position through a releasable engagement to a hook 56 secured to an unlabeled ceiling in the interior of the truck 16. This first operational mode, as illustrated in FIG. 3, allows a user ready access to articles contained within the briefcase 48 without presenting the need to exit the truck 16 as is typical with conventional vehicle storage compartments.

FIG. 4 illustrates the second operational mode of the center compartment assembly 26 and it can be seen from this figure that the center compartment assembly may be pivoted upon the hinge 28 in a manner which allows access to the interior of the main body 12 by the user from within the truck 16 through the opening 30 in the rear window 32. In this mode, the center compartment assembly 26 is released through the well understood actuation of a lower lockable latch 58 which releasably and lockably secures the upper enclosure 40 in a horizontal position. The upper enclosure 40, as well as both of the access lids 18, 20, are provided with gas cylinders 60 which automatically raise their associated pivotally connected components upon an actuation of any of the latches 22, 24, 58. Although not illustrated, the upper enclosure lid 42 may also be provided with such a gas cylinder 60.

Slidably disposed within the main body 12 is a sliding tray 62 having a pair of unlabeled brackets extending outwardly therefrom which are operable to reside upon the upper compartment flange 38 to support the sliding tray 62 therewithin. Upon an opening of the center compartment assembly 26 as described above, the user may access articles contained within the sliding tray 62 from within the truck 16. In addition, the sliding tray 62 may be moved laterally within the main body 12 to obtain access to articles contained therebelow or proximate thereto.

Figure 5:
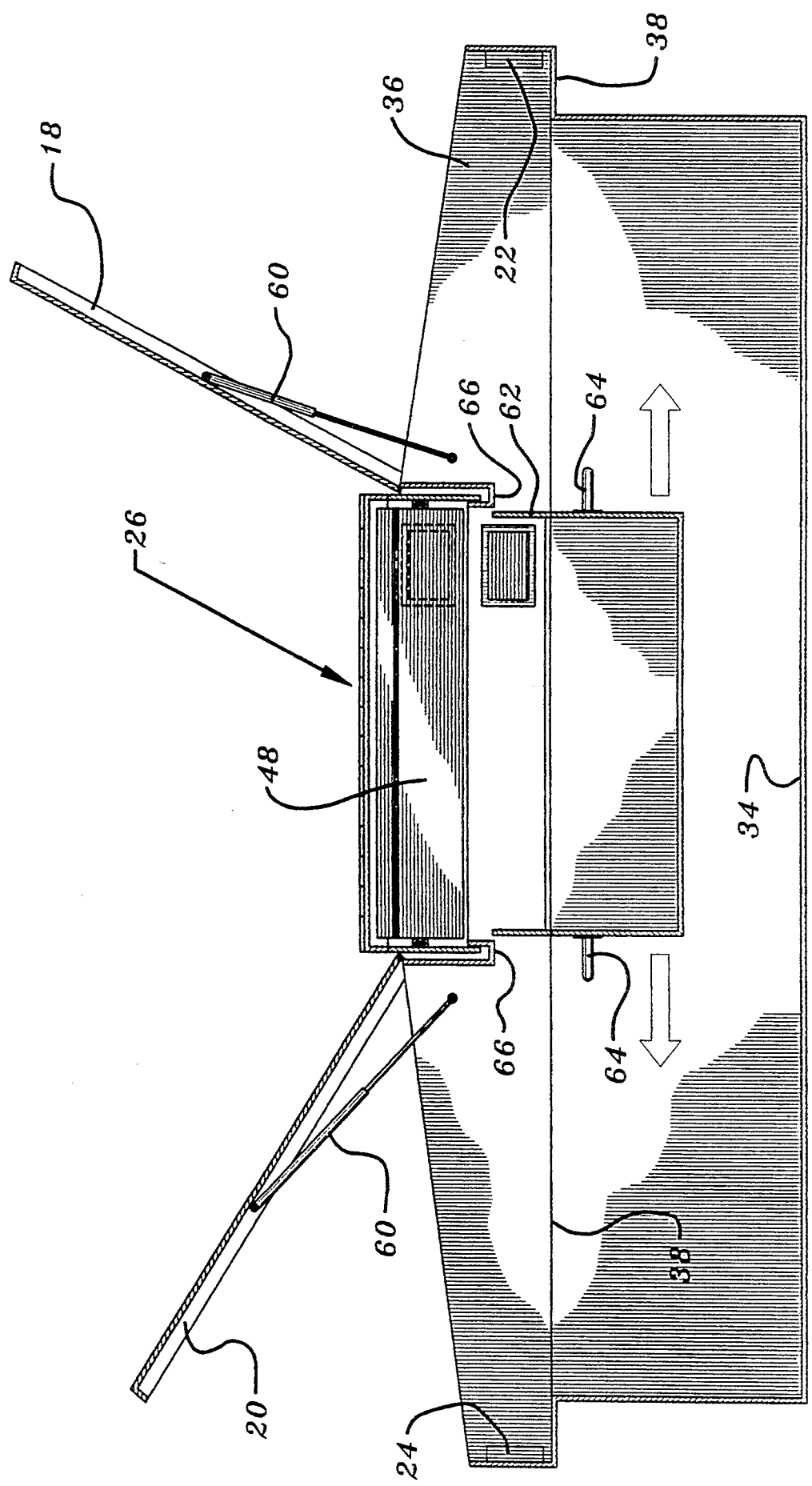
FIG. 5 is a cross-sectional view taken along line 5—5 of FIG. 3.

The moveable positioning capability of the sliding tray 62 is best illustrated in FIG. 5 and it can be seen from this figure that the sliding tray 62 is equipped with handles 64 which may be utilized to laterally position the sliding tray in a well understood manner. The sliding tray 62 may also be selectively removed from within the main body through the openings in the upper compartment 36. Removal of the sliding tray 62 will provide the storage box 10 with the ability to contain larger objects when needed.

Also illustrated in FIG. 5 are a pair of integral gutters 66 which flank respectively opposed sides of the center compartment 26. The integral gutters 66 are shaped in such a manner so as to preclude an entrance of water into the interior of the main body 12 and channel such water away therefrom. Because the integral gutters 66 are substantially U-shaped, no sealing material is needed between the upper enclosure 40 and the upper compartment 36. However, should an air-tight seal be desired, suitable sealing materials may be positioned therebetween.

In use, the truck storage box 10 allows a user to conveniently access articles contained within the truck box through the opening 30 in the rear window 32 of the associated truck 16. The briefcase 48 may be utilized to contain small, or easily misplaced articles, as well as documents and other sensitive items. The sliding tray 62 may be utilized to contain other individual items or to contain beverages within an ice bath. Surrounding the sliding tray 62 with a suitable insulating material is contemplated for such a latter use. In addition, the sliding tray 62 may be provided with a suitable drain means for draining water therefrom, as well as a flexible tube for directing such drained water exteriorly of the main body 12.

Figure 6:
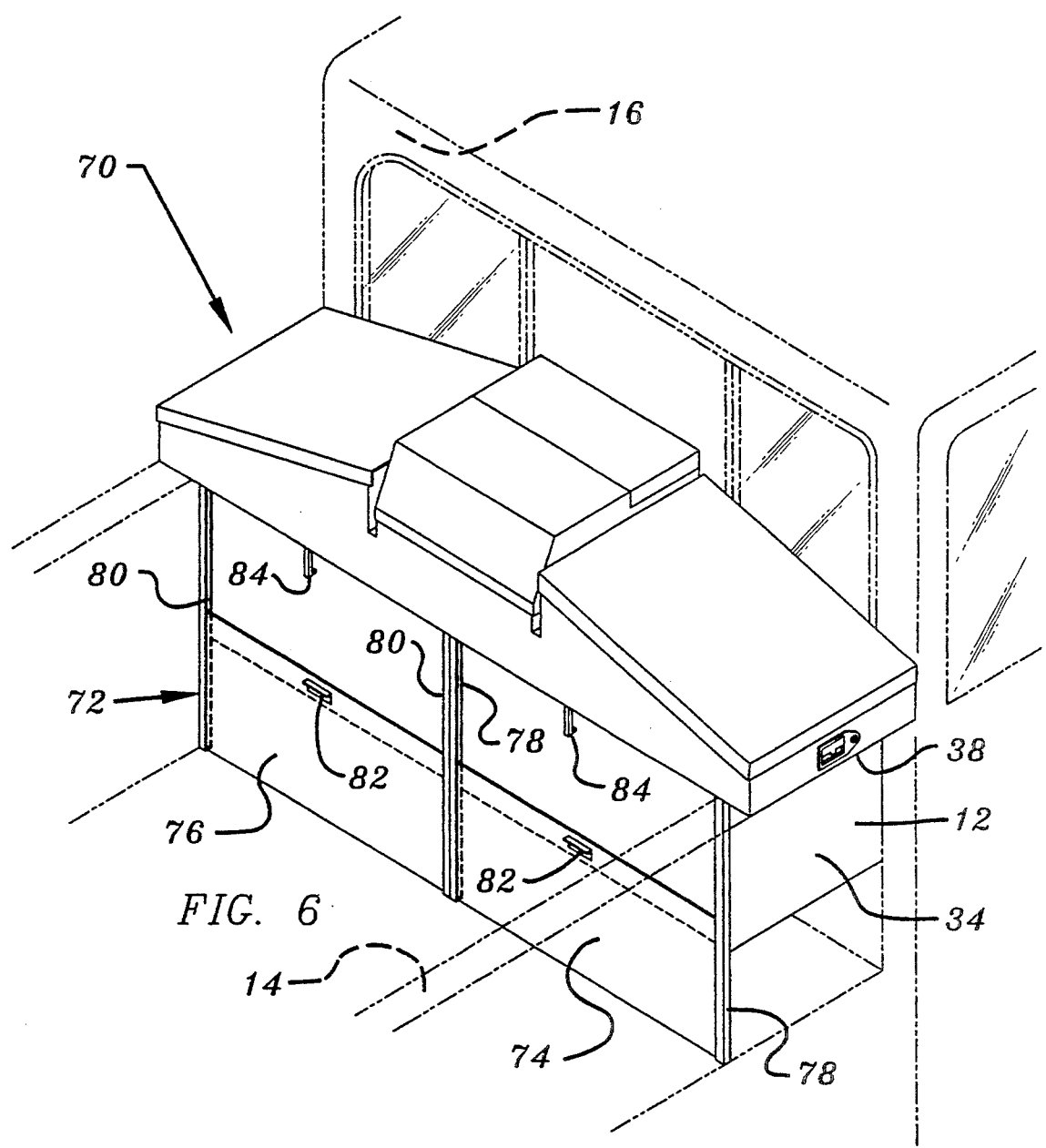
FIG. 6 is a perspective view of a second embodiment of a rear window accessible pickup truck storage box comprising the present invention.
Figure 7:
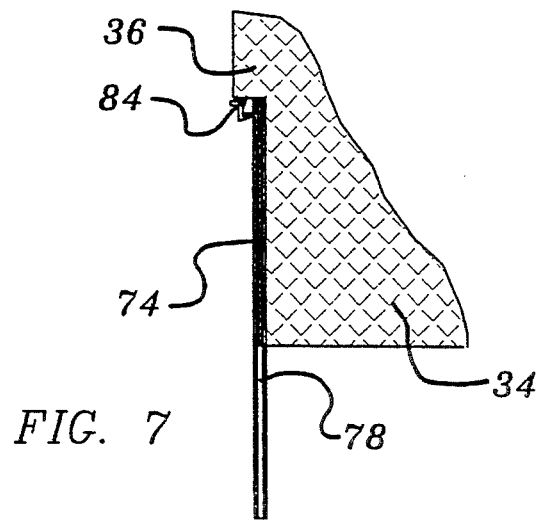
FIG. 7 is an enlarged side elevation view of a portion of the second embodiment.

A second embodiment of the present invention as generally designated by the reference numeral 70, which comprises substantially all of the features of the foregoing embodiment 10 and which further comprises a sliding door assembly 72 will now be described. As best shown in FIGS. 6–7, it can be shown that the sliding door assembly 72 is secured to the lower compartment 34 and is operable to enclose a volume of space beneath the main body 12 of the storage box 70. To accomplish such enclosure, the sliding door assembly 72 comprises a pair of sliding doors 74, 76 which are each slidably disposed within respective pairs of vertical channels 78, 80. The pairs of vertical channels 78, 80 are coupled to the lower compartment 34 by conventional means such as fasteners, welding, and the like, and extend from the upper compartment flange 38 to the unlabeled floor of the truck bed 14. The sliding doors 74, 76 are then positionable within the pairs of vertical channels 78, 80 in such a manner so as to enclose the volume of space beneath the main body 12.

To retain the sliding doors 74, 76 in their uppermost position, each of the doors is provided with a sliding door handle 82 which may be engaged to a pivotally mounted catch 84, as best illustrated in FIG. 7. This structure allows the sliding door 74, 76 to be secured in either an uppermost position or a lowermost position according to the desires of the user. Although two sliding doors 74, 76 are illustrated in the second embodiment, it is within the intent and purview of the present invention to include any number of sliding doors to effectively enclose the volume of space beneath the main body 12 of the truck storage box 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rear window accessible pickup truck storage box for use with a truck having a bed and a rear window, said storage box comprising:
   a main body which can be secured to a portion of said bed, said main body having a center area and an interior;
   at least one access lid means pivotally coupled to said main body for facilitating access to said interior of said main body;
   and,
   a center compartment assembly means pivotally coupled to said center area of said main body for facilitating access to said interior of said main body,
   wherein said center compartment is pivotally arranged to open towards said rear window,
   wherein said center compartment assembly means comprises an enclosure pivotally coupled to said main body, said enclosure having a pair of opposed interior surfaces, said enclosure further having an enclosure lid pivotally coupled thereto, wherein said lid can be opened to allow insertion and removal of articles within said enclosure, and further wherein said enclosure can be pivoted to allow access to said interior of said main body,
   wherein said center compartment assembly means further comprises a briefcase having a pair of sides; a pair of elongated projections, one of said projections being secured to each of said sides; and a pair of channels, one of said channels being secured to each of said opposed interior surfaces of said enclosure, wherein said projections can be slidably engaged to said channels to support said briefcase within said enclosure.

2. The rear window accessible pickup truck storage box of claim 1, and further comprising a tray slidably supported within said main body.

3. The rear window accessible pickup truck storage box of claim 2, wherein said main body comprises a lower compartment having a length and a width; and an upper compartment having a length and a width, wherein said length and width of said upper compartment are greater than said length and width of said lower compartment such that a difference between said length and width of said upper compartment and said length and width of said lower compartment defines an upper compartment flange which can be positioned upon an upper surface of said bed to support said main body in a spaced relationship with respect to a floor of said bed.

4. The rear window accessible pickup truck storage box of claim 3, and further comprising a sliding door means coupled to said main body for enclosing a volume of space between said main body and said floor of said bed.

5. The rear window accessible pickup truck storage box of claim 4, wherein said sliding door means comprises at least one vertical channel coupled to said main body; and at least one sliding door slidably secured to said at least one vertical channel, wherein said at least one sliding door can be positioned in such a manner so as to at least partially enclose said volume of space.

6. A rear window accessible pickup truck storage box for use with a truck having a bed and a rear window, said storage box comprising:
   a main body having a center area and an interior, said main body further having a flange therearound, wherein said flange can be positioned upon an upper surface of said bed to support said main body in a spaced relationship with respect to a floor of said bed;
   a pair of access lid means pivotally coupled to said main body for facilitating access into an interior of said main body;
   and,
   a center compartment assembly pivotally coupled to said center area of said main body,
   wherein said center compartment opens toward said rear window,
   wherein said center compartment assembly comprises an enclosure pivotally coupled to said main body, said enclosure having a pair of opposed interior surfaces, said enclosure further having an enclosure lid pivotally coupled thereto; a briefcase having a pair of sides; a pair of elongated projections, one of said projections being secured to each of said sides; and a pair of channels, one of said channels being secured to each of said opposed interior surfaces of said enclosure, wherein said lid can be opened to allow said projections to be slidably engaged to said channels to support said briefcase within said enclosure, and further wherein said enclosure can be pivoted to allow access to said interior of said main body.

7. The rear window accessible pickup truck storage box of claim 6, and further comprising a tray slidably supported within said main body.

8. The rear window accessible pickup truck storage box of claim 7, and further comprising a sliding door means for enclosing a volume of space between said main body and said floor of said bed, said sliding door means comprising: at least one vertical channel coupled to said main body; and, at least one sliding door slidably secured to said at least one vertical channel, wherein said at least one sliding door can be positioned in such a manner so as to at least partially enclose said volume of space.

* * * * *